US012072465B2

(12) United States Patent
Woodbury et al.

(10) Patent No.: US 12,072,465 B2
(45) Date of Patent: Aug. 27, 2024

(54) REMOTE INSECT DETECTOR

(71) Applicant: S. C. Johnson & Son, Inc., Racine, WI (US)

(72) Inventors: Nathan Woodbury, Vancouver (CA); Anthony Hoover, Vancouver (CA); Naseem Hammoud, Vancouver (CA); Zachary Morris, Vancouver (CA)

(73) Assignee: S. C. Johnson & Son, Inc., Racine, WI (US)

( * ) Notice: Subject to any disclaimer, the term of this patent is extended or adjusted under 35 U.S.C. 154(b) by 375 days.

(21) Appl. No.: 17/526,427

(22) Filed: Nov. 15, 2021

(65) Prior Publication Data
US 2022/0155482 A1 May 19, 2022

Related U.S. Application Data

(60) Provisional application No. 63/114,445, filed on Nov. 16, 2020.

(51) Int. Cl.
*G01V 8/00* (2006.01)
*A01M 1/02* (2006.01)
*A01M 1/10* (2006.01)
*G01V 8/12* (2006.01)

(52) U.S. Cl.
CPC ............... *G01V 8/12* (2013.01); *A01M 1/026* (2013.01); *A01M 1/103* (2013.01)

(58) Field of Classification Search
CPC .............................. A01M 1/026; A01M 1/103
See application file for complete search history.

(56) References Cited

U.S. PATENT DOCUMENTS 6,882,279 B2 * 4/2005 Shuman ............... A01M 1/026
340/573.1
2007/0044372 A1 * 3/2007 Lang .................... A01M 1/026
43/114

OTHER PUBLICATIONS

Aboul-Nasr, A.E. et al., The Effect of Light Reactions Upon the Bed-Bug, Bull. Soc. ent, Egypte, LII, 1968, 52:337-351.
Anderson, J. et al., A Carbon Dioxide, Heat and Chemical Lure Trap for the Bedbug, Cimex lectularius, Medical and Veterinary Entomology, 2009, 23(2):99-105.
Cooper, R. et al., Mark-Release-Recapture Reveals Extensive Movement of Bed Bugs (Cimex lectularius L.) within and between Apartments, PloS ONE, 2015, 10(9):e0136462, pp. 1-20.
Cooper, R. et al., Chapter 27, Detection and Monitoring, in Advances in the Biology and Management of Modern Bed Bugs, 2018, pp. 241-255.
Gries, G., Chapter 17, Chemical Ecology, in Advances in the Biology and Management of Modern Bed Bugs, 2018, pp. 163-172.
Hentley, W. et al., Bed Bug Aggregation on Dirty Laundry: A Mechanism for Passive Dispersal, Scientific Reports, 2017, 7:11668, pp. 1-5.

(Continued)

*Primary Examiner* — Dani Fox
(74) *Attorney, Agent, or Firm* — Quarles & Brady LLP

(57) ABSTRACT

An improved remote insect detector is disclosed. The detector includes a pitfall trap that is adapted to trap a target insect within the pitfall trap. An insect funnel passage is located below the pitfall trap and is dimensioned to retain the target insect in a detecting position. An optical beam detection circuit operates to detect the target insect in the detecting position and operates to generate a detection signal.

10 Claims, 13 Drawing Sheets

(56) References Cited

OTHER PUBLICATIONS

Hinson, K. et al., Climbing Ability of Teneral and Sclerotized Adult Bed Bugs and Assessment of Adhesive Properties of the Exoskeletal Fluid Using Atomic Force Microscopy, PloS ONE, 2017, 12(12):e0189215, pp. 1-13.

Hottel, B. et al., Climbing Ability of the Common Bed Bug (Hemiptera: Cimicidae), Journal of Medical Entomology, 2015, 52(3):289-295.

Kim, D. et al., Differences in Climbing Ability of Cimex lectularius and Cimex hemipterus (Hemiptera: Cimicidae), Journal of Economic Entomology, 2017, 110(3):1179-1186.

Polanco, A. et al., Population Growth Potential of the Bed Bug, Cimex lectularius L.: A Life Table Analysis, Insets, 2011, 2(2):173-185.

Schaafsma, E. et al., Bed bug (Cimex lectularius L.) Population Composition as Determined by Baited Traps, Insects, 2012, 3(2):442-452.

Siljander, E. et al., Identification of the Airborne Aggregation Pheromone of the Common Bed Bug, Cimex lectularius, Journal of Chemical Ecology, 2008, 34:708-718.

Stedfast, M. et al., Development and Evaluation of a Proactive Bed Bug (Hemiptera: Cimicidae) Suppression Program for Low-Income Multi-Unit Housing Facilities, Journal of Integrated Pest Management, 2014, 5(3):1-7.

Wang, C. et al., Interceptors Assist in Bed Bug Monitoring, Pest Control Technology, 2009, 37(4):112-114.

Weeks, E. et al., Semiochemicals of the Common Bed Bug, Cimex lectularius L. (Hemiptera: Cimicidae), and their Potential for Use in Monitoring and Control, Pest Management Science, 2011, 67(1):10-20.

\* cited by examiner

REMOTE INSECT DETECTOR

CROSS REFERENCE TO RELATED APPLICATIONS

This application claims priority to U.S. Provisional Application Ser. No. 63/114,445, filed on Nov. 16, 2020, and entitled "Remote Insect Detector," which is incorporated by reference in its entirety.

REFERENCE REGARDING FEDERALLY SPONSORED RESEARCH OR DEVELOPMENT

Not applicable.

SEQUENTIAL LISTING

Not applicable.

BACKGROUND OF THE DISCLOSURE

1. Field of Disclosure

Some embodiments of the present disclosure relate to improved remote insect detection devices. In particular, some embodiments of the present invention relate to remote insect detection devices having one or more of improved physical, detection, monitoring, and cost characteristics.

2. Description of the Background of the Disclosure

Pest control professionals, non-professional consumers, and building residents use various detectors to visually inspect for insects, such as bed bugs. Detectors are often used to verify the success of former treatments and to locate new insect infestations. After a pest control technician treats a residence, hotel room, or multi-unit dwelling for bed bugs or other insects, there is a significant chance that some pest insects or their eggs escaped treatment. This then requires the technician to return to treat the residence again multiple times. Typically, many professional pest controllers guarantee the success of their treatment, knowing that they will likely have to return to the residence or room for a follow-up treatment. Many professionals verify treatment success by deploying and then inspecting visual insect detectors within the treated residence. Visual bed bug or other insect detectors are also deployed by professionals to pinpoint the location of difficult to locate pest insect infestations before and after treatment. Similarly, non-professional consumers and residents often rely upon visual inspection of bed bug or other insect detectors or traps to verify if any pest insects escaped recent treatments. The detectors are also used to pinpoint the location of any existing infestations.

Bed bug and other insect infestations in hotels and multi-unit dwellings are difficult to predict and, when discovered, require rapid treatment. A large number of hotels and multi-dwelling residences contract with pest control companies to manage pests such as insects within the entirety of the facility. Currently, most hotels and many building managers do not discover the presence of a bed bug or other pest insect in a room until an occupant of a room sees an insect or worse, is bitten by a pest insect.

Bed bugs or other insects typically enter hotel rooms or residences by either wandering in from adjacent rooms, or by hitch-hiking on the luggage, on the clothing, or on other items brought into the room by a guest. A single insect is able to reproduce rapidly enough to greatly increase the pest insect population within a single generation. This rapid population growth, combined with the tendency of pest insects to travel and wander, can quickly lead to a wider infestation of additional units within a building. Therefore, insects that have recently arrived in a room should be detected early and treated quickly to prevent any spread to adjacent rooms. Also, if bed bug or other insect presence is detected in one room, special attention should be given to the surrounding rooms where the insects may have travelled.

Failure to detect bed bugs or other insects early in a room increases the time, effort, and cost of the overall treatment. The cost of treating multiple units, as opposed to just one unit, can become extremely expensive. Any pest insect contact with any room occupant can financially harm a hotel in several ways. First, the hotel often reimburses the occupant for the hotel stay. Second, the hotel must pay pest control technicians to then treat the room or rooms. Third, the hotel can suffer reputational damage in the opinion of the occupant or in the opinion of the general public if the infestation is publicized. Fourth, in extreme cases, hotel rooms are completely torn down and reconstructed to ensure that the bed bug or other insect infestation is totally eliminated.

In the prior art, detection efficacy of bed bugs or other insects has been proven by using bed-leg pitfalls. Bed-leg pitfall interceptors or detectors are typically bowl-shaped pitfalls that are placed directly under the legs of beds or other furniture. The bed bug or pest insect falls into the bowl, and cannot escape, leading to a relatively easy way to detect pest insects. However. due to their size and conspicuous placement, these detectors are not very discrete, and are typically undesirably conspicuous while in use. The outer surface of the bowl may typically possess a rough texture that allows bed bugs or other pest insects to crawl upwards into the pitfall, and the inner surface is smooth enough in texture to prevent pest insects from climbing back out of the pitfall. Bed bugs or pest insects may initially move toward the $CO_2$ gradient exhaled by a human host present in the bed or other furniture. Because these detectors are placed directly under bed-legs and furniture-legs, they form a physical chokepoint that pest insects must crawl over as they follow the $CO_2$ gradient and attempt to locate the human host present on the bed or furniture.

However, these devices are typically very conspicuous since they have a large size and that the devices are placed under bed legs during use. This conspicuousness makes them undesirable for most hotels since hotels generally avoid drawing attention to any risk of a bed bug or other insect infestation. Also, a typical hotel or multi-unit dwelling contains many rooms. Since at least one monitor is required per bedroom, and each monitor requires periodic visual inspection to verify the absence or presence of pest insects, these types of detectors have drawbacks. These types of detectors can be time-intensive, labor-intensive, and require significant room/occupant coordination to both set up and routinely inspect. As such, due to their large size and conspicuous placement, these detectors are typically rarely used in hotels or other facilities, where discretion is a priority despite the need for pest insect detection.

In the prior art, unbaited detectors, for example "sticky-mat" or "sticky-chamber" detectors, are one common detector design. Unbaited detectors typically consist of a flat mat coated with an adhesive. The mat is housed within a small cardboard or plastic chamber containing entrance holes for bed bugs or other insects. This style of detector is typically inexpensive and may be placed onto almost any horizontal surface, under beds, under furniture, or directly above boxsprings. These detectors do not contain a lure, so encounters with pest insects rely upon insects randomly encountering the detector after reacting to exhaled CO2 from a nearby human host.

Increased CO2 presence activates searching behavior in bed bugs and other insects. Insect detection requires a user to visually inspect the trap or detector for any pest insect that happened to enter the entrance holes and get stuck to the adhesive. This detection system is commonly used by non-professionals for detecting infestations of pest insects within their own residence. The efficacy of this trap or detector design typically has an undesirable amount of variability because the encounters with the detector are random.

In the prior art, CO2, pheromone, and semiochemical baited detectors typically include an adhesive mat surrounded by a small cardboard or plastic box, similar to the unbaited detectors described above. However, unlike unbaited sticky mats, these baited detectors release bed bug aggregation pheromone, carbon dioxide or other semiochemicals known to lure or bait bed bugs or other insects to the point of the release. These baited detectors are typically inexpensive and can be placed in the same locations as unbaited sticky mat detectors.

The presence of a lure increases the probability that pest insects will encounter the detector compared to an unbaited detector. However, some pest insects do not always respond to the lure due to their insect physiology or due to local bait or lure concentration. This lack of response causes an undesirable variable detection efficacy. In addition, bed bugs or other insects may circumvent these detectors while wandering. This detection system is also commonly used by non-professionals for detecting pest insect infestations within their own residence.

In the prior art, wall-mounted detectors with remote notification are another type of bed bug or other insect detector. The detectors typically consist of a plastic case containing a semiochemical lure, an entry slot leading to an internal optical chamber with an optical sensor, electronics capable of remote electronic notification, and an AC power cord. The detector case may be screwed or adhered vertically to a wall, such as behind the headboard of a bed. The power cord is plugged into a nearby AC power outlet. In addition to the detector case, this detector system also relies upon applying adhesive tape or some other insect climbing barrier around either bed legs or around the perimeter of legless bed frames. This prevents pest insects from circumventing the detector such as by climbing onto the bed. These detectors can contain a lure or bait. The pest insect or bed bug can encounter the detector after reacting to exhaled CO2 from a nearby human host, or alternatively by being drawn to the detector by an emitted lure. When a pest insect has crawled into the pitfall of the detector, its presence is detected by an electronic sensor and/or an optical image.

These images or sensory input are sent electronically to trigger a remote alert, such as via Wi-Fi to a user mobile device in order to notify a user that bed bugs or other pest insects are present. Therefore, these detectors may not require visual inspection. However, these detection devices, and the subscriptions to these devices, can be substantially more expensive than other detector types. In addition, the need for AC power limits the use of these detectors to areas of a room near where an AC power outlet is present. Since the device's power cord may also contact the headboard, mattress or bed-frame, the power cord can become a pest insect pathway to the bed, which allows pest insects to circumvent the detector. The detector may also undesirably be triggered to detect insects other than bed bugs or other pest insects, since several smaller insect species are capable of entering the optical chamber. The detection efficacy of these devices is not well established yet. Accordingly, these detectors have not been widely adopted by professionals or by non-professionals. Presumably, this is due to the higher cost, deeper complexity, and the reduced set-up versatility of the detector.

It follows then that there is a need for a bed bug or other insect detector that is relatively inconspicuous, more efficacious, cost effective, and has the ability to function without the need for direct visual inspection.

SUMMARY OF THE INVENTION

In some embodiments, a bed bug, or other insect detector is provided with an inventive combination of features so as to desirably provide an efficacious, inexpensive detector that can be placed almost anywhere, is easy to set up, is designed to operate with minimal power and automatically notifies a user about the presence of a bed bug or other insect, so as to desirably save time over detector designs requiring manual inspection, which is especially desirable when deployed in a large, multi-unit building.

In one aspect, a remote insect detector has a pitfall trap, an insect funnel passage, and an optical beam detection circuit. The pitfall trap is adapted to trap a target insect within the pitfall trap. The insect funnel passage is located below the pitfall trap and is dimensioned to retain the target insect in a detecting position. The optical beam detection circuit operates to detect the target insect in the detecting position and to then generate a detection signal.

In some embodiments, the detector has a housing that contains the pitfall trap, the insect funnel passage, and the optical beam detection circuit. In some embodiments, a plurality of insect entrance holes in the housing lead into the housing and provide a pathway for the target insect to enter the housing and reach the pitfall trap. In some embodiments, the housing is substantially elliptical in outer shape, and a top cover fits over the housing, and the top cover is adapted to restrict entry of light into the pitfall trap. In some embodiments, the target insect of the detector is a bed bug. In some embodiments, the pitfall trap has an upper rim that connects the outer surface and the inner surface of the pitfall trap together. In some embodiments, the inner surface is substantially smooth in texture, and is adapted to cause the target insect to fall into the pitfall trap.

In some embodiments, the pitfall trap has a frustum with a substantially conical frustum shape, wherein an outer surface of the frustum has a substantially textured surface, and an inner surface of the frustum has a substantially smooth surface. The target insect can climb the outside surface but then falls down the inside surface, becoming trapped in the pitfall trap. In some embodiments, a detection beam passage intersects with the insect funnel passage in order to position the target insect within the funnel passage into a detecting position. In some embodiments, the detector has a wireless communication transmitter, which is adapted to transmit the detection signal electromagnetically. In some embodiments, the optical beam detection circuit is powered by a battery power source.

In some embodiments, a bed bug or other insect detector is provided which desirably comprises a unique internal pitfall design and desirably provides for several functional benefits, such as a reduced false detection of non-target insects, a high detection efficacy, a low power consumption, an improved battery life, a low cost, a smaller discrete size, and a variety of versatile placement options during use.

In some embodiments, the remote insect detector additionally comprises a wireless communication transmitter, such as Wi-Fi, Bluetooth, RF, LPWAN, Z-Wave, ZigBee, or other suitable wireless communication transmitter, adapted to transmit the detection signal electromagnetically. In some embodiments, the transmitted signal is sent to a user monitoring device or service. In some embodiments, the optical beam detection circuit may desirably be powered by a battery power source.

In addition to the exemplary aspects and embodiments described above, further aspects and embodiments will become apparent by reference to the following drawings and description.

DETAILED DESCRIPTION OF THE DRAWINGS

Throughout the following description, specific details are set forth in order to provide a more thorough understanding to persons skilled in the art. However, well known elements may not have been shown or described in detail to avoid unnecessarily obscuring the disclosure. Accordingly, the description and the accompanying Figures are to be regarded in an illustrative, rather than a restrictive, sense.

Unless defined otherwise, all technical and scientific terms used herein have the same meaning as commonly understood by one of ordinary skill in the art to which this disclosure belongs. As used herein, singular forms include plural references unless the context clearly dictates otherwise. As used herein, "comprises" or "comprising" are to be interpreted in their open-ended sense, i.e. as specifying that the stated features, elements, steps or components referred to are present, but not excluding the presence or addition of further features, elements, steps or components.

As used herein, all numerical values or numerical ranges provided expressly include integers within such ranges and fractions of the values or the integers within ranges unless the context clearly indicates otherwise. Thus, for example, reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. Therefore, as used herein, where a range of values is provided, it is understood that each intervening value between the upper and lower limit of that range and any other stated or intervening value within that stated range is encompassed within embodiments of the disclosure. The upper and lower limits of these smaller ranges may independently define a smaller range of values, and it is to be understood that these smaller ranges are intended to be encompassed within embodiments of the disclosure, subject to any specifically excluded limit in the stated range.

In some embodiments of the present disclosure, an improved remote bed bug or other insect detector is provided. The detector comprises a unique internal pitfall design and desirably provides for several functional benefits. These benefits include a reduced false detection of non-target insects, a high detection efficacy, a low power consumption, an improved battery life, a low cost, a smaller discrete size, and a versatility in the placement options for the detector. In some embodiments, the improved remote insect detector may additionally comprise at least one additional feature, such as having insect guidance spindles on the exterior of the housing.

Figure 1:
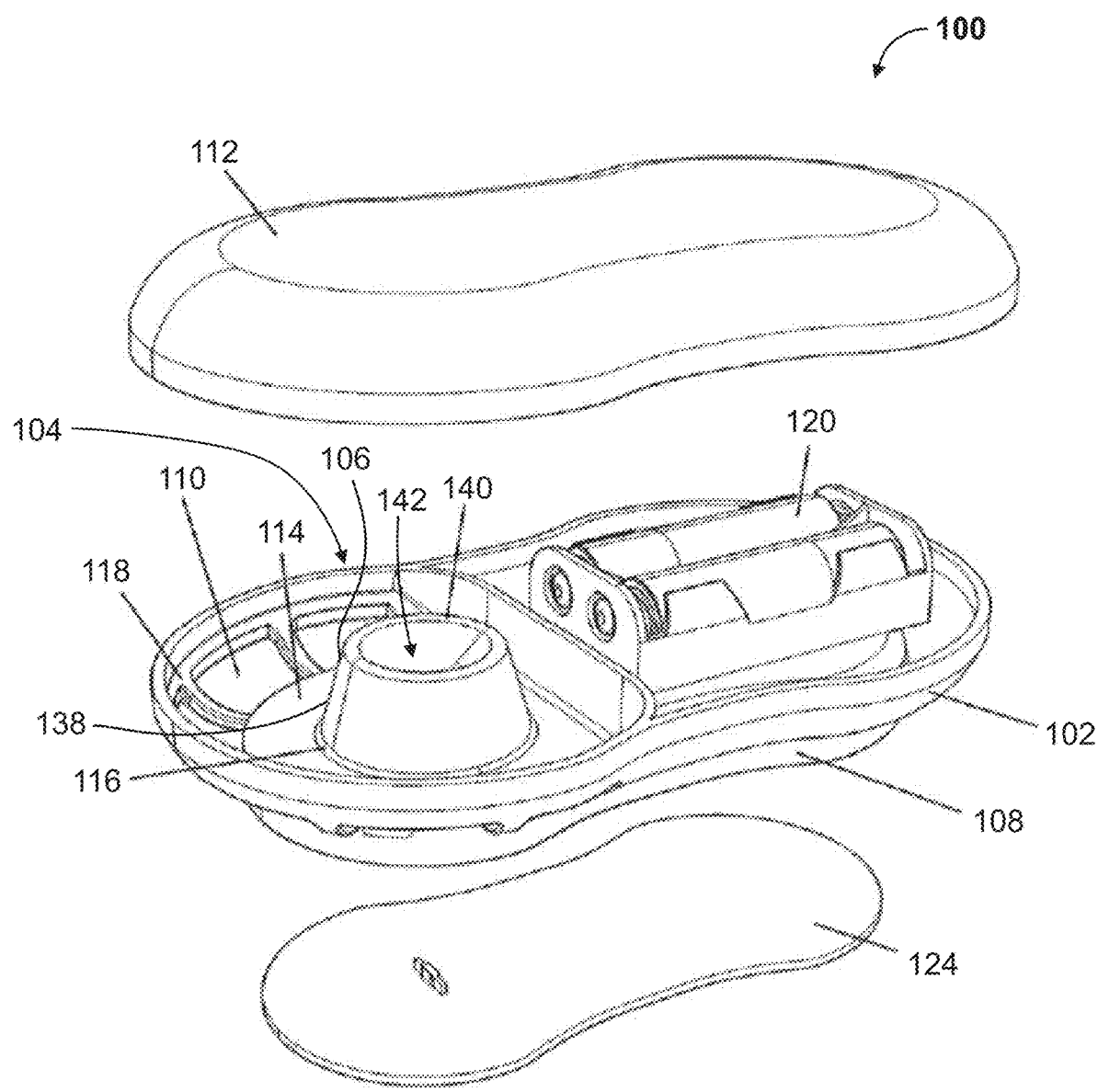
FIG. 1 illustrates an open perspective view of a remote insect detector according to an embodiment of the present invention, showing several internal components.
Figure 2:
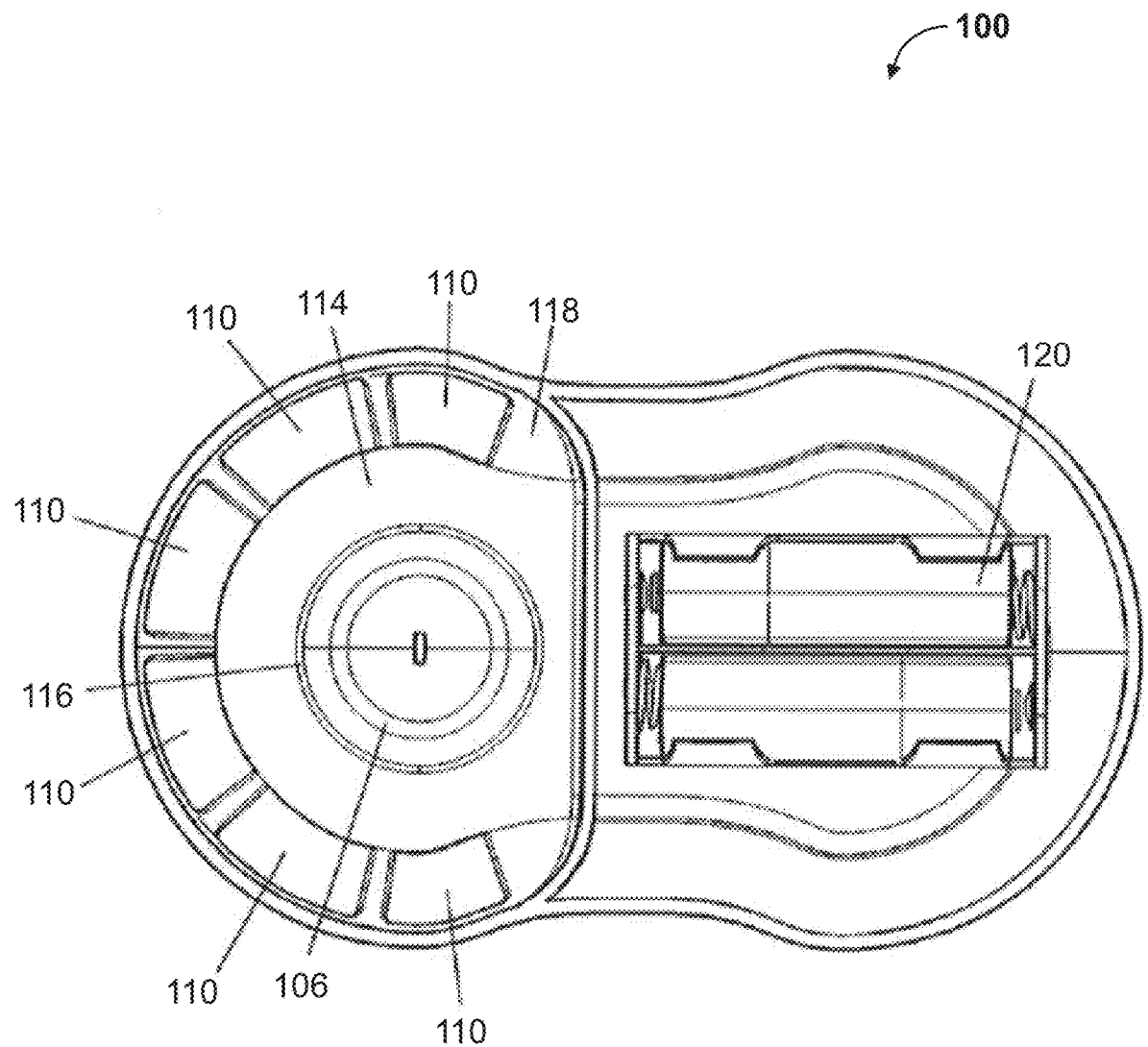
FIG. 2 illustrates a top view of the detector of FIG. 1, showing several internal components.

With reference to FIGS. 1 and 2, in some embodiments, an improved remote insect detector 100 comprises a housing 102 with a pitfall chamber 104 within the housing 102. The housing 102 and a pitfall frustum 106 (see FIG. 1) may have surfaces with a texture, size, and angle that help guide bed bugs or other insects into the housing 102 of the detector 100 and further into the pitfall chamber 104 to be trapped. In some embodiments, the housing 102 comprises injection-molded polypropylene, ABS, or another suitable plastic that provides a durable, smooth-textured surface. The outward facing surface of the housing 102 may be smooth-textured so as to desirably prevent bed bugs or other insects from climbing onto or over the detector. In some embodiments, a lower perimeter edge 108 of the housing 102 projects upwards from a horizontal floor surface to create a dark, narrow space along the entire length of a perimeter of the housing 102. Dark, narrow spaces are preferred by bed bugs. This desirably provides the effect that bed bugs or other pest insects encountering the housing 102 of the detector 100 travel along the perimeter edge 108 until the pest insects encounter at least one entrance hole 110 that leads to the pitfall chamber 104 (see Experiments A and B), which is darkened in part due to a removable cover 112 (see FIG. 1).

Figure 3:
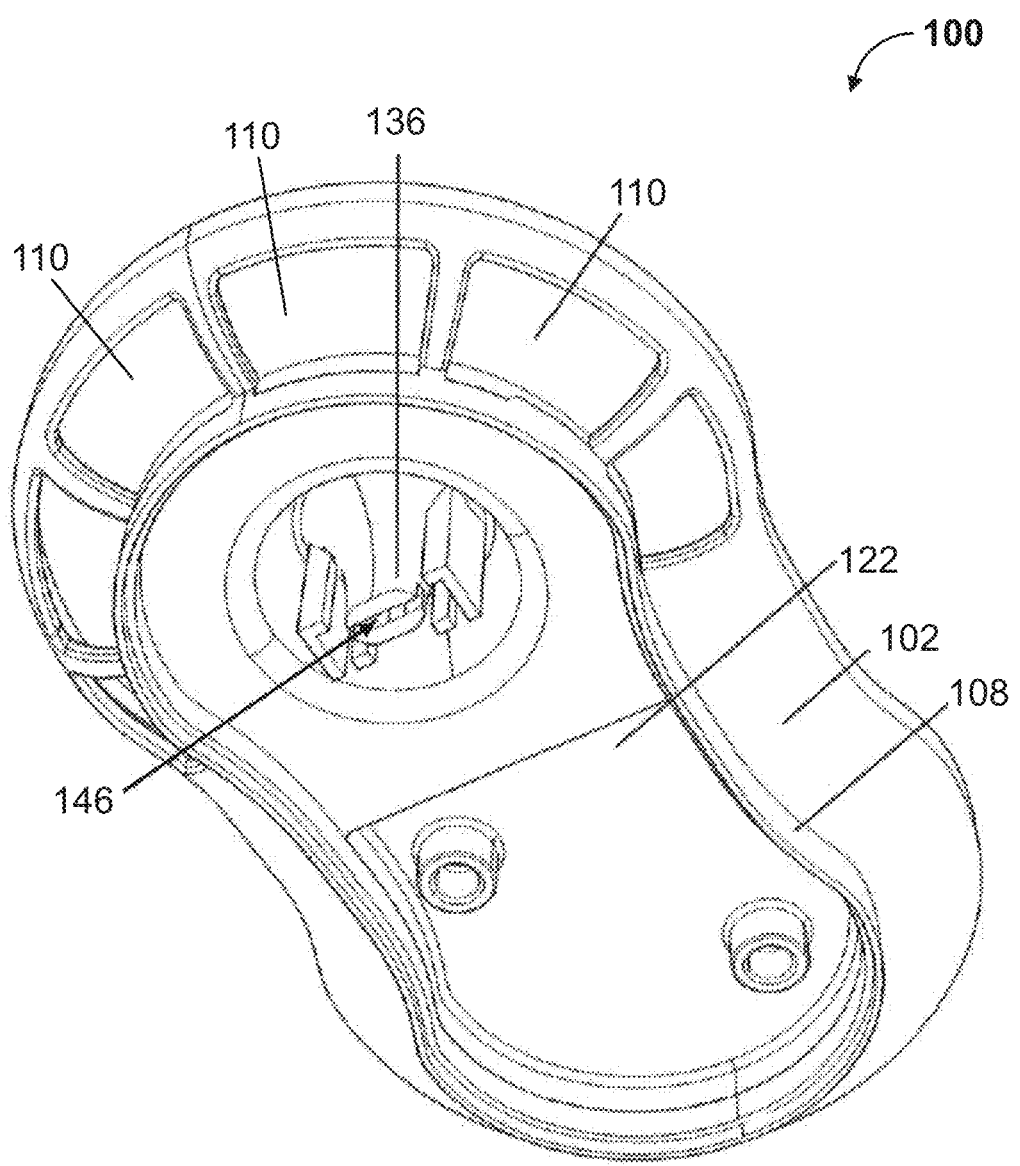
FIG. 3 illustrates a bottom view of a case of the detector of FIG. 1.
Figure 4:
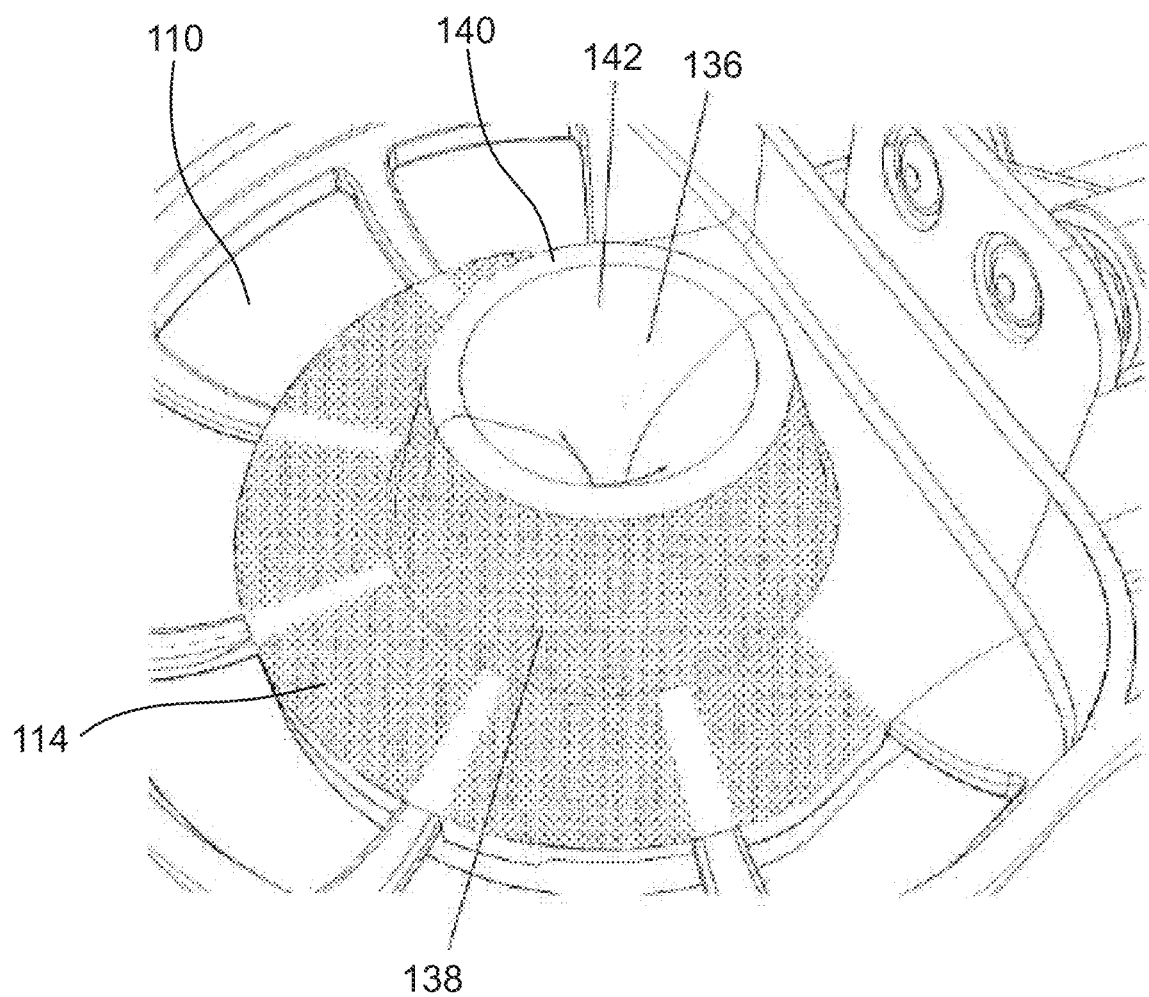
FIG. 4 illustrates a top perspective view of a pitfall chamber with a pitfall funnel feature shown within the detector of FIG. 1.
Figure 5:
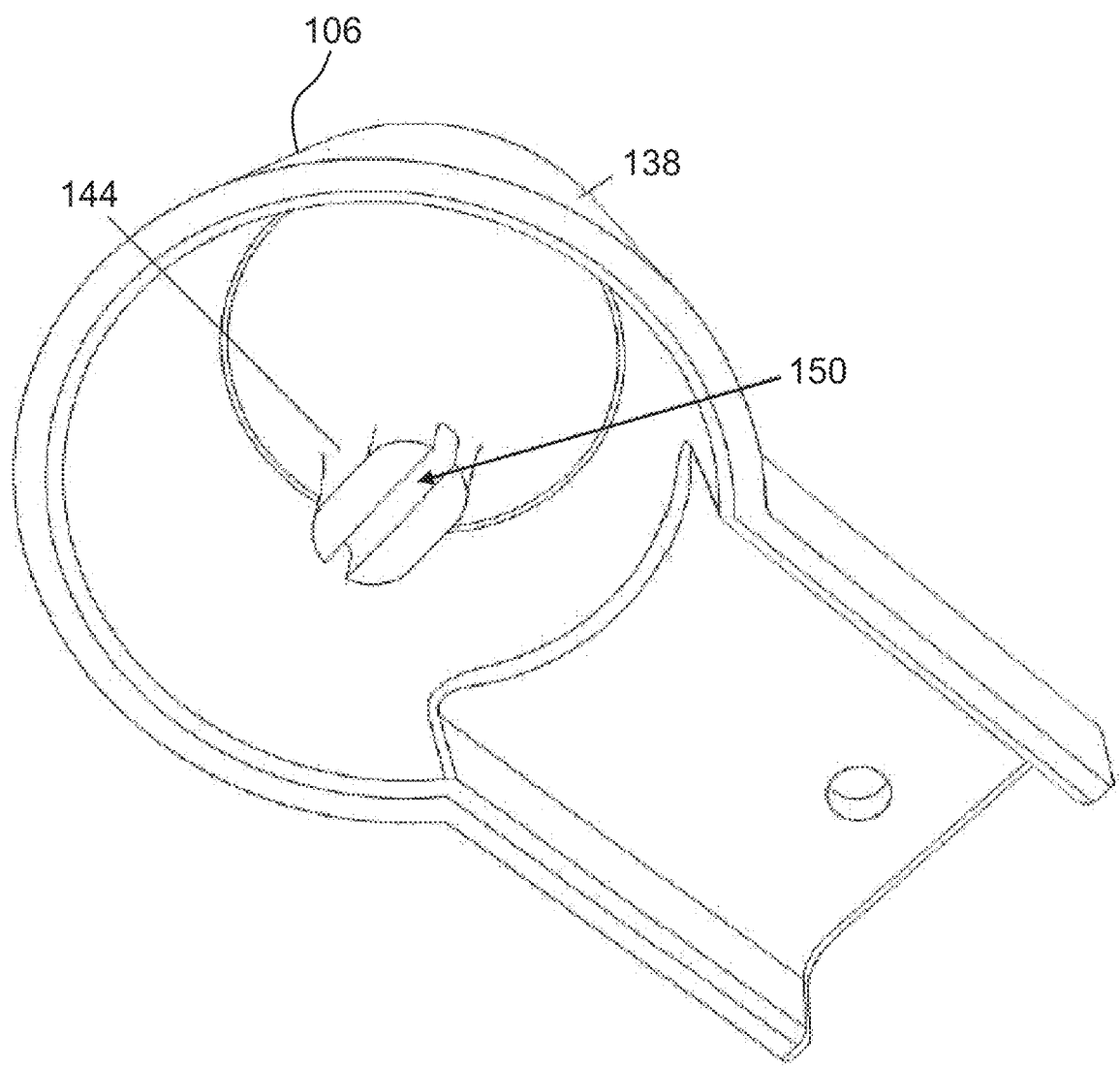
FIG. 5 illustrates a perspective view of the underside of the pitfall funnel feature of the detector of FIG. 4.
Figure 6:
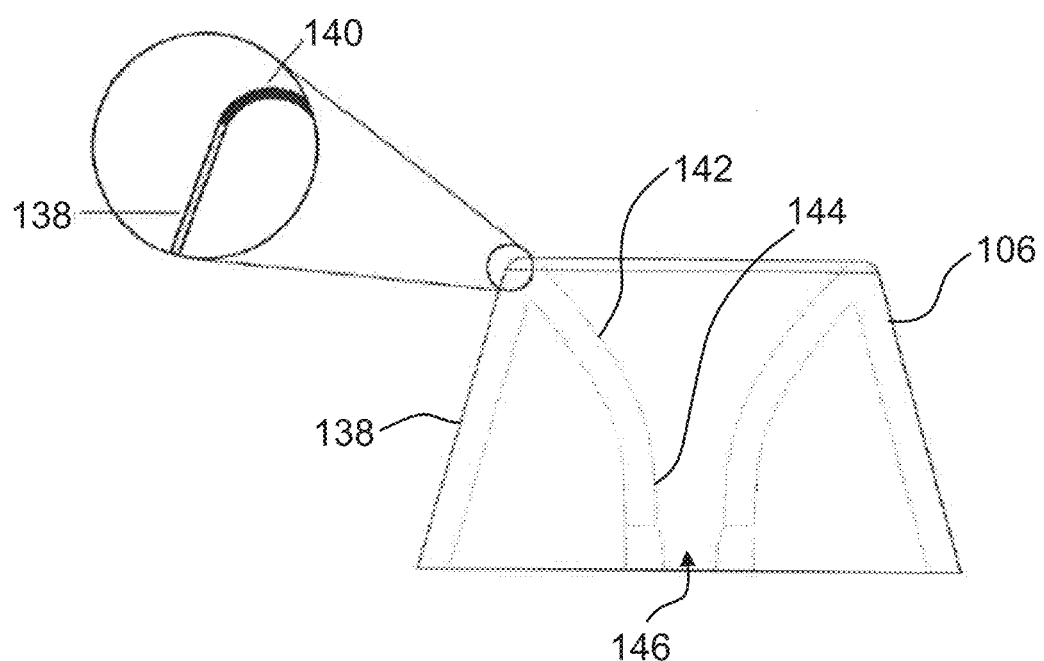
FIG. 6 illustrates a partial, schematic, front cross-sectional inset view of a rim of a pitfall chamber with a pitfall funnel feature of the detector of FIG. 1.

Bed bugs and other pest insects prefer darkness (i.e., have a negative phototaxis) and are desirably attracted to the darkness of the pitfall chamber 104. In addition, a floor surface 114 of the pitfall chamber 104 may desirably be rough in texture to allow bed bugs within the chamber 104 to easily travel to an outer base 116 of a conically shaped pitfall frustum 106. An inner wall 118 of the housing 102 and an underside of the removable cover 112 are desirably smooth in texture to prevent bed bugs or other pest insects from climbing the inner wall 118. This tends to improve the rates of the pest insects encountering the pitfall frustum 106. The at least one entrance 110 to the pitfall chamber 104 is shown in FIGS. 1 and 2. In one such embodiment, the pitfall chamber 104 and a set of batteries 120 may be enclosed by the removable cover 112. The removable cover 112 also serves to prevent light from entering the pitfall chamber 104, prevent dust and other debris from falling into the pitfall frustum 106, and selectively allows access to the pitfall frustum 106 for cleaning or visual confirmation of the capture of bed bugs or other pest insects. The removable cover 112 selectively permits the replacement of the set of batteries 120 when desired. In one embodiment, a signaling electronics chamber 122 (see FIG. 3) is also sealed within a lower cover 124 to prevent damage to the sensitive electronics and to prevent bed bugs or any other insects from entering the electronics.

Figure 7:
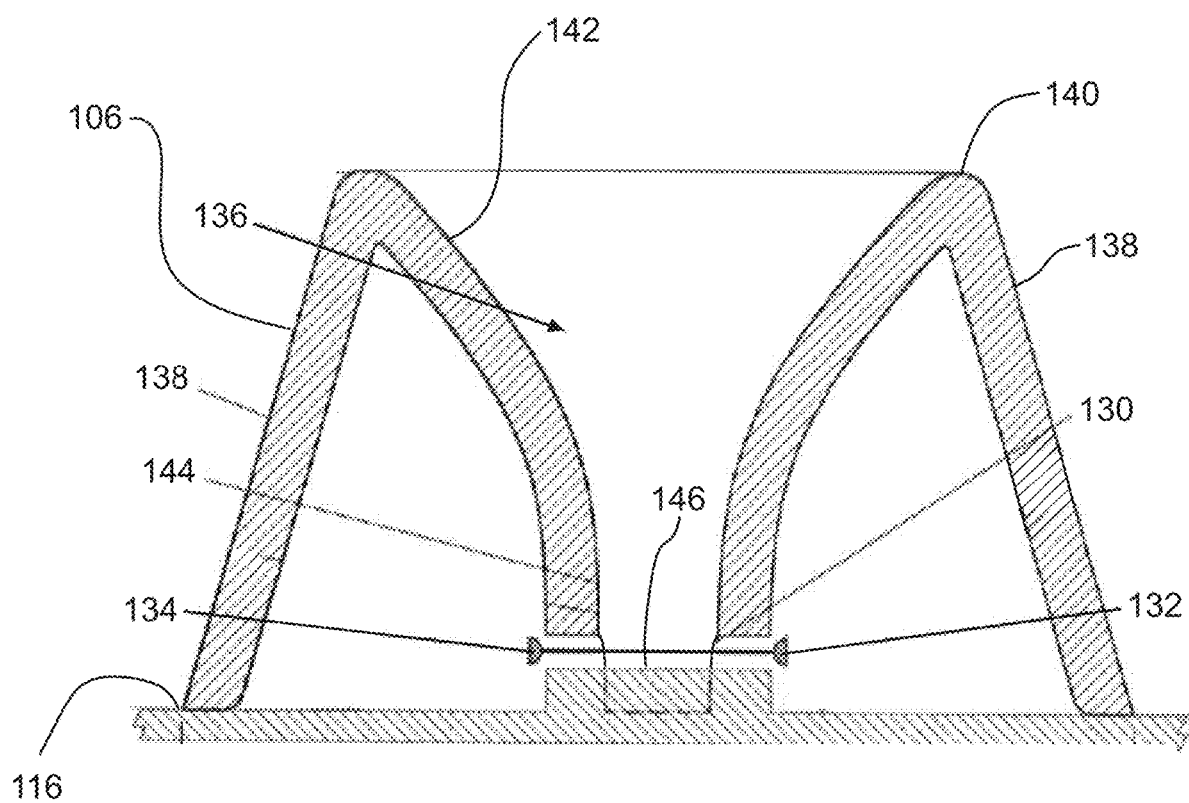
FIG. 7 illustrates a partial, front cross-sectional view of a pitfall chamber with a pitfall funnel feature of the detector of FIG. 1.

With reference to FIGS. 3-7, in some embodiments, an electro-optical detection beam or infrared beam 130 is produced by an electro-optical detection beam or infrared beam emitter 132 and selectively received by an electro-optical detection beam or infrared beam detector or receiver 134 (see FIG. 7). The pitfall frustum 106 has an inner surface or pitfall funnel 136. Bed bugs or other insects encountering the miniaturized pitfall desirably climb up a rough outer surface 138 to a smooth-textured transition surface 140 on the outside of the pitfall's apical rim (see FIG. 6). This transition point may desirably be optimized to prevent bed bugs or other insects from gripping the outer surface of the rim while traversing to the funnel 136 of the rim. Pest insects that fall into the funnel 136 cannot escape due to a smooth inner surface 142 of the funnel 136. Besides having a slippery internal surface 142, the funnel 136 steepens to direct bed bugs or other insects into a trap region 144 (see FIG. 7) located at an extreme base 146 of the funnel 136.

The extreme base 146 is preferably narrowed, flattened, and shaped to the dimensions of an adult bed bug or another target insect. This forces the pest insect to align across an electro-optical detection beam or infrared beam channel 150 (see FIG. 5). One side of the pitfall frustum 106 contains the infrared beam emitter 132 that emits the infrared beam 130 across the infrared beam channel 150 to the infrared beam receiver 134 on the opposite side of the extreme base 146. When the infrared beam channel 150 is clear, the infrared beam 130 is freely emitted by the infrared beam emitter 132 and received by the infrared beam receiver 134 which electronically indicates that a bed bug or other insect is not present inside the extreme base 146 of the funnel 136. When a pest insect climbs up the external surface 138 of the pitfall frustum 106 and slides down the funnel 136 into the extreme base 146, the pest insect blocks the infrared beam channel 150 and prevents the emitted infrared beam 130 from being detected by the infrared beam receiver 134.

Figure 8:
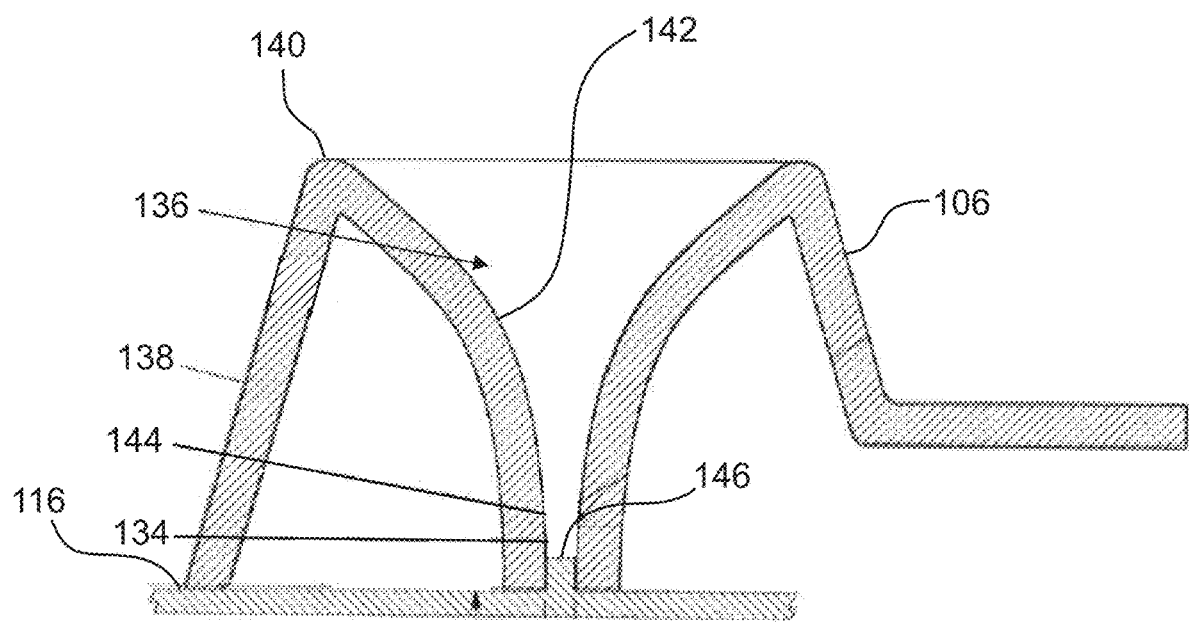
FIG. 8 illustrates a partial, side cross-sectional view of the pitfall chamber with the pitfall funnel feature shown in FIG. 7.

Referring to FIGS. 7 and 8, in some such embodiments, if the infrared beam 130 is obstructed by a bed bug or other insect, and does not reach the infrared beam receiver 134, a "non-detect" signal is sent to the detector's electronic detection circuitry. In some embodiments, the electronic detection circuitry is located in the signaling electronics chamber 122 (see FIG. 3). In some embodiments, the electronic detection circuitry may comprise a wireless electronic transmitter, such as a Wi-fi emitter, which transmits a notification. The notification may be received by any type of receiver, including being received by a user mobile device through a local Wi-Fi router, to a user's mobile device directly, or to another device capable of receiving the signal. Alternatively, the notification is provided via blue-tooth or via another form of electromagnetic transmission.

In some embodiments, an improved remote insect detector may desirably be configured with the pitfall frustum 106 (see FIG. 1) having the outer surface 138 and the funnel 136 designed to increase the insect capture rate while reducing false detection. In some embodiments, a particular advantage provided by using a pitfall frustum 106 with a rough-texture for the outer surface 138 that must be climbed and a smooth-texture for the inner surface 142 of the funnel 136, is that some insects, in particular bed bugs, are synanthropic pests that will habitually climb rough vertical surfaces but are simultaneously unable to climb a smooth-textured surface. In contrast, other common pest species which may otherwise be the appropriate size to enter the detector housing 102 and the pitfall frustum 106 are either not compelled to climb the outer surface 138 of the pitfall frustum 106, or are able to easily climb back up the smooth texture of the funnel 136. This allows certain non-target species adequate time to escape from the extreme base 146 and the infrared beam channel 150.

Still referring to FIGS. 7 and 8, this in turn significantly decreases the probability that non-target species will be present inside the infrared beam channel 150 at the time the infrared beam 130 is periodically pulsed from the infrared beam emitter 132. In addition, the walking path of an insect from the at least one entrance 110 of the detector 100 to the infrared beam channel 150 requires any abiotic materials (e.g., dust, hair, lint, etc.) to travel upwards, over the outer surface 138 of the pitfall frustum 106, and then down into the infrared beam channel 150. This route requires vertical force acting opposite to gravity, which prevents most abiotic material from entering the extreme base 146 and blocking the infrared beam channel 150 that would otherwise cause a false pest insect detection (see Experiment C).

In some embodiments, an improved remote insect detector is 100 provided wherein the pitfall chamber 104, the infrared beam emitter 132, and the infrared beam receiver 134 provide for low power consumption. By trapping the pest insect in the extreme base 146 within the channel 150 to cause the interruption of the infrared beam 130, the infrared beam 130 can be emitted by the infrared beam emitter 132 as a periodic pulse. In some embodiments, the infrared beam 130 is emitted once per minute, or once per hour, or once per day, or any other desirable interval of time. This leads to a considerable reduction of power consumption in comparison to a constant beam or to some form of optical imaging and scanning.

Still referring to FIGS. 7 and 8, this reduction of power consumption may allow the set of batteries 120 to last longer, thereby providing a viable alternative to a continuous AC power supply. The use of a periodic pulsed infrared beam 130 from the infrared beam emitter 132 may desirably increase battery life and allow for use of cheaper, readily available alkaline consumer batteries rather than higher capacity lithium-ion or other higher cost batteries.

In some embodiments, using the infrared beam emitter 132 and the infrared beam receiver 134 may desirably allow for insect detection in darkness, when many insects, including bed bugs, are most active. Bed bugs and other certain insects are known to preferentially move away from lighted areas and move toward darkened areas (i.e. a negative phototaxis) where they tend to aggregate and lay their eggs. The infrared beam 130 does not create and does not require any visible light to function. As a result, the infrared beam 130 does not repel pest insects like bed bugs or negatively influence pest insect movement near or inside the detector. In addition, the pitfall chamber 104 is dark and the housing 102 is designed to be placed inside dark spaces. The infrared beam 130 allows the detector 100 to function properly even inside these darkened areas.

The pitfall chamber 104 and the compact infrared beam channel 150 provides ways to have a small sized housing 102 that can be placed in a wide variety of placement locations. The internal components of the detector 100 can be small, and yet still remain effective. Therefore, the external dimensions of the detector 100 can also remain small. This in turn permits a more versatile placement of the detector 100 in confined spaces, under and behind furniture, and in other locations, as opposed to the limited places that the prior art small, un-baited 'sticky mat' and small, baited detectors can be placed.

Figure 9:
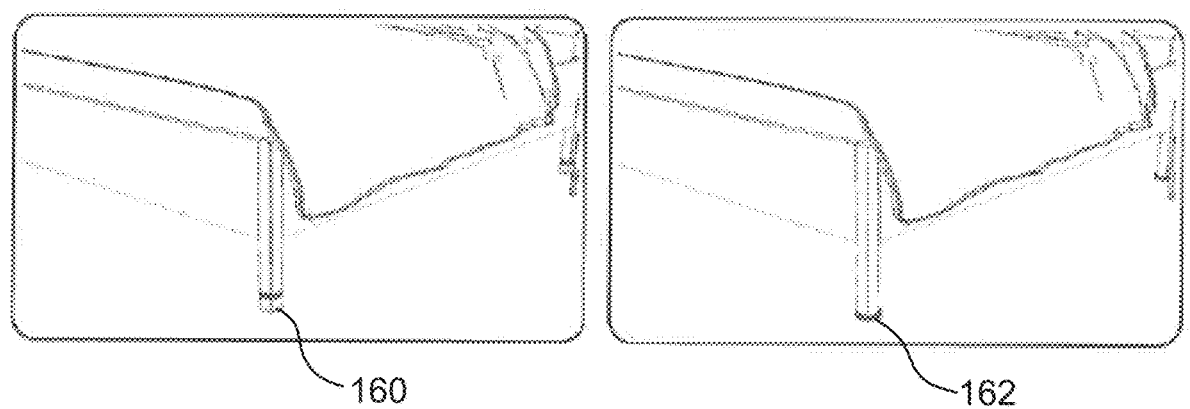
FIG. 9 illustrates the application of insect exclusion tape or coasters around a bed or an article of furniture.

With reference to FIG. 9, in some embodiments, insect exclusion tape 160 or coasters 162 may optionally also be used to help guide insects, such as bed bugs, into the pitfall chamber 104 and prevent them from circumventing the detector 100. Bed bugs and other certain insets cannot crawl vertically over smooth textured surfaces. Smooth textured coasters 162 can be placed under bed legs, headboards or bed frames to prevent bed bugs and other certain insects from crawling vertically onto the bed (FIG. 9). In addition or alternatively, smooth textured tape 160 can be applied to bed legs, bed frames, headboards and the wall behind beds to prevent bed bugs from crawling onto the bed. Using slippery coasters 162 or tape 160 in combination with the detector 100 prevents bed bugs and other certain insects from climbing onto the bed and circumventing the detector 100 (FIG. 9). Deploying exclusion coasters 162 or tape 160 increases the probability that pest insects or bed bugs will encounter the detector 100 and climb into the pitfall chamber 104 because the rough-textured outer surface 138 of the pitfall frustum 106 within the pitfall chamber 104 is the only vertical surface that the insect can climb that is under, on, or near to the bed.

Figure 10:
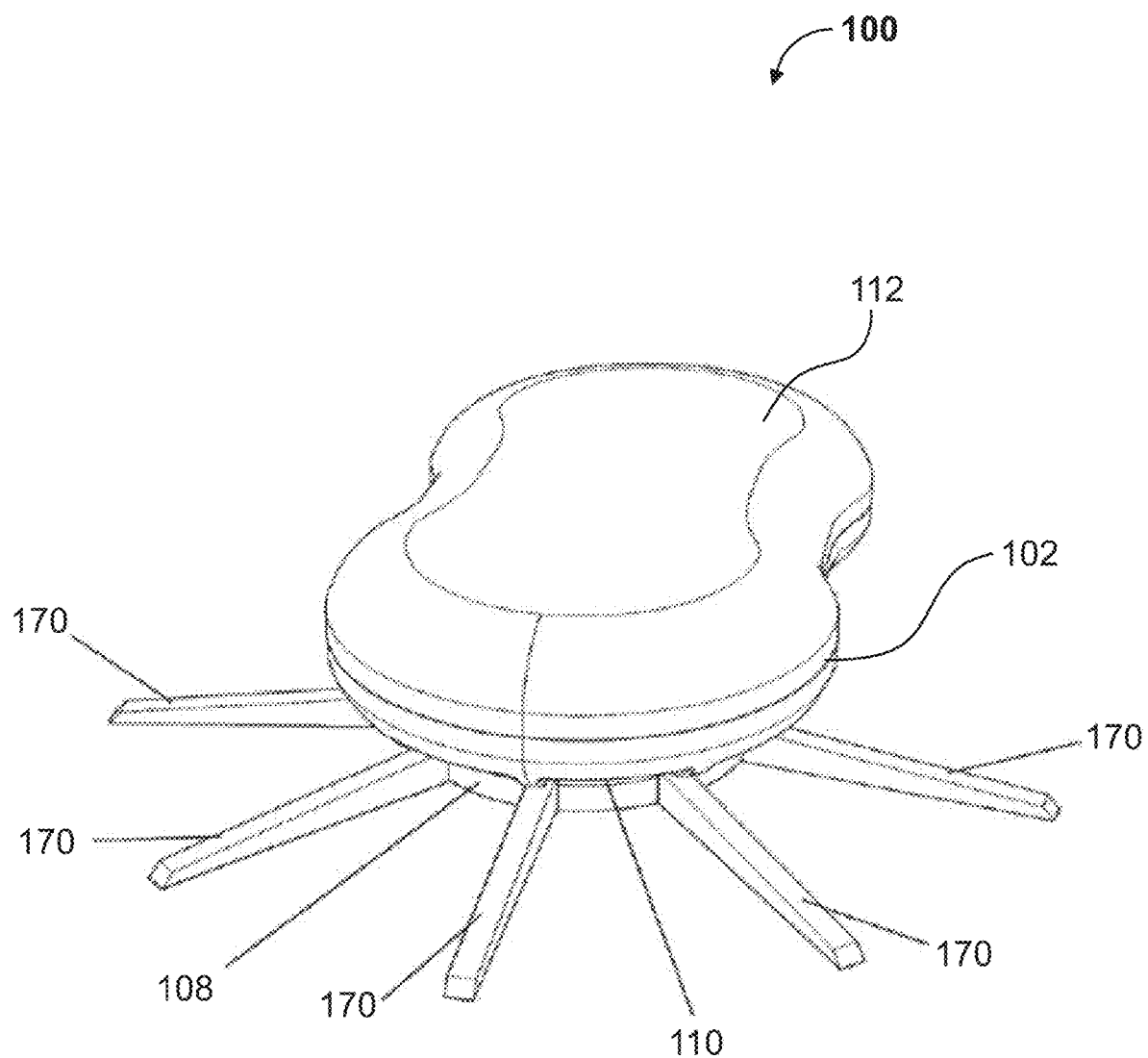
FIG. 10 illustrates a perspective view of an embodiment of the detector of FIG. 1 with insect guidance spindles extending from a housing of the detector.

With reference to FIG. 10, lures or a set of perimeter spindles 170 may be optionally used to increase the probability of insects, such as bed bugs, encountering the detector 100. In one such embodiment, an optional semiochemical lure (e.g., bed bug pheromone, CO2, mammalian skin compounds) or abiotic cues (e.g., heat) may be added to the improved insect detector 100 to assist in luring pest insects to the detector and thereby increase the probability of pest insects entering the pitfall chamber 104.

Bed bugs demonstrate a tendency to climb, or "edge-follow" when the surface is too slippery to climb, once the bed bugs encounter a barrier. To exploit this tendency, the set of spindles 170 may radiate outward from the perimeter edge 108 of the housing 102 to increase the surface area of the perimeter of the housing 102. This effective increase in the surface area of the perimeter of the housing 102 increases the probability of bed bugs or other insects encountering the detector 100. Each of the set of spindles 170 may desirably possess a smooth-texture, which prevents bed bugs or other certain insects from climbing over the set of spindles 170 and guides them toward the entrance holes 110 along the perimeter edge 108.

Experimental Example 1: Effect of an Exemplary Detector Housing Size & Shape on Bed Bug Capture Rate Purpose: This experimental example is intended to determine if bed bugs preferentially reside on or inside traps with square, circular, elliptical, or elongate-separated housing designs. These design variants were created to accommodate an internal pitfall trap, two double A batteries, circuit board(s), and IR-LEDs necessary to electronically detect and signal the presence of a bed bug. This bioassay was also intended to test if channels and smoothed trap surfaces can exclude bed bugs from upper surfaces and guide the bugs inside the channels, internal chambers, and pitfalls. In addition, this assay was intended to determine if live bed bugs will enter at least one trap design and become trapped within the pitfall.

Figure 11:
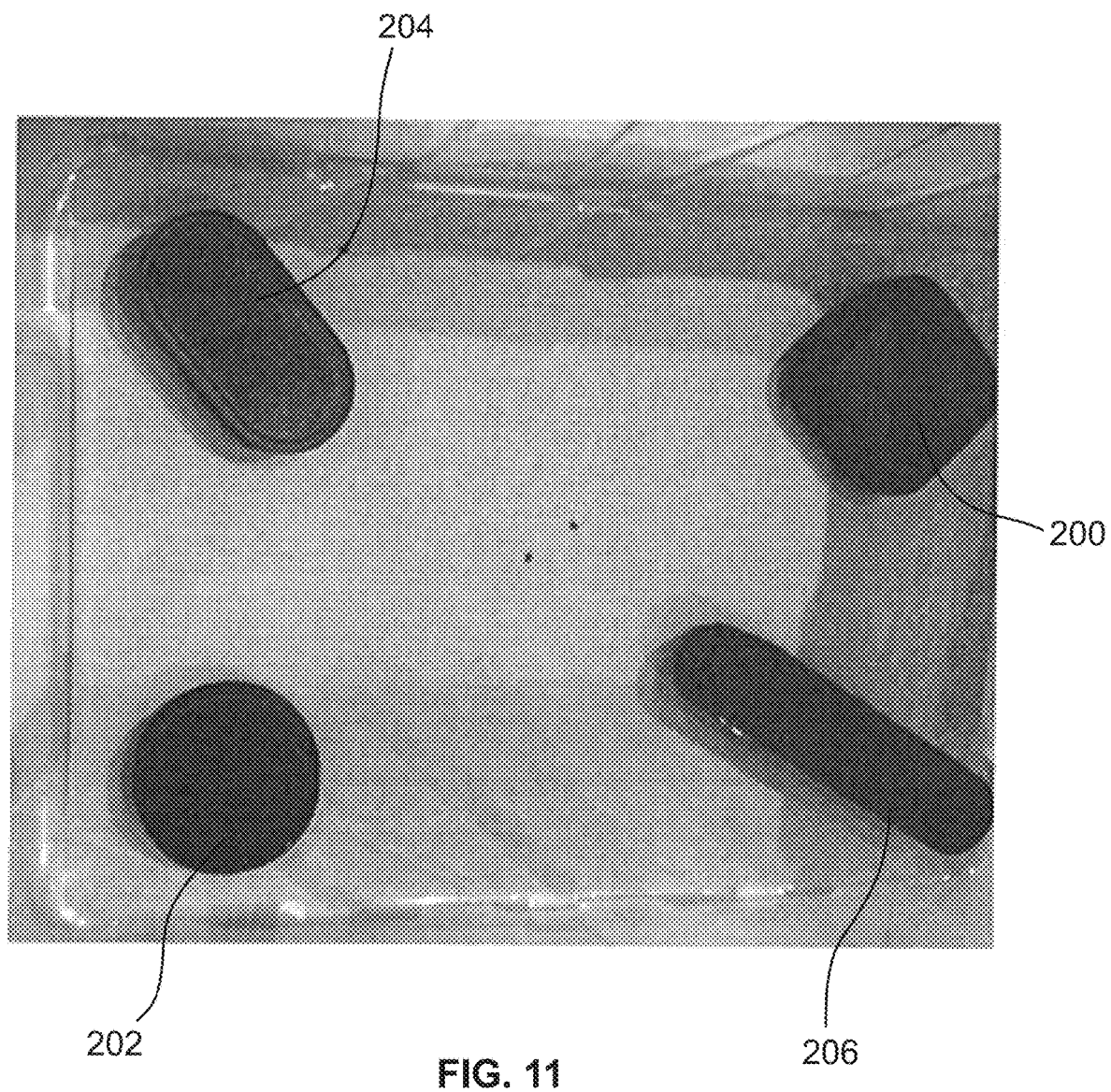
FIG. 11 is an image of four different embodiments of the detector of FIG. 1, having a square, a round, an elliptical, or an elongated housing shape respectively.

Materials & Methods: Four bed bug trap housings shaped as a square 200, a circle 202, an ellipse 204, and an elongate housing 206, and were designed using Rhino and Solidworks CAD software, then 3D printed using an Ultimaker 3 printer. Each trap's dimensions were as follows and as shown in FIG. 11: the elliptical housing 204 (9.5 cm L×5 cm W×2 cm H); the elongate housing 206 (9.8 L×4 W×2.5 H ellipse separated from a 4 cm diam.×2.5 cm H pitfall); square housing 200 (7.8 cm L×7.8 cm W×2.2 cm H); and the circular housing 202 (7.7 cm diam.×2.2 cm H). Each trap was designed to accommodate an internal pitfall trap, two double A batteries, circuit board(s), and IR-LEDs necessary to electronically detect and signal the presence of a bed bug. The elliptical, elongate, and square traps also contained a pitfall intended to trap any bugs that climbed or fell into them.

The outer surface of each trap housing and the internal surface of each pitfall was dry sanded with successive passes of 200, 400, 800, and 2000 grit sandpaper with a final pass of 2000 grit wet sanding then polishing using Brasso. The external surface of the pitfalls was sanded with 200 grit paper to create a rough texture that bed bugs could climb on. Each trap was placed equidistant into each corner of a square plastic arena (15"W×21"L×12"H). Five healthy adult bed bugs were released into the center of the arena and allowed to explore the space for 30 minutes, after which time each trap was opened and inspected and the location of each bug was recorded. The test was repeated 20 times using 5 bugs per test and the location of each trap was randomly changed with each test. Bug location inside or on each trap housing was compared using Chi Squared analysis (alpha <0.05, n=4).

Results: Adult bed bugs entered all four trap housing designs and were prevented from climbing on the upper surfaces of traps by the smoothly sanded surfaces. Many bugs were found sitting on or moving along lower channels indicating that channels helped guide bugs along the external surface of traps. These results indicate that the traps are capable of capturing live bugs.

Bed bugs entered the elliptical housing 204 significantly more than the other 3 trap designs. Bed bugs were found on the outer, lower surface of the elongate trap 206 significantly more than the other 3 trap designs. Both the elliptical housing 204 and elongate housing 206 were slightly longer than the round and square traps, which increased the chance of bed bug encounters with the traps. The elliptical trap 204 contained an entrance chamber that allowed bed bugs to enter the inside of the housing. The elliptical trap 204 did not contain an entrance chamber, so the bugs had to climb the external surface of the housing to fall into the pitfall, which is why a significantly high number of bugs were observed on the housing but not inside the housing.

The square, elliptical, and elongate traps 200, 204, 206 required bugs to climb a frustum, shallow cone, and cylinder, respectively. Each of these pitfall designs captured bugs within 30 minutes but there were no significant differences between the pitfall types. Out of 16 tests with 5 bugs per test, bugs were found inside traps in only 6 of these tests.

Thirty minutes was deemed to be an adequate amount of time to allow bugs to fully explore traps. However, increasing test time may improve pitfall capture rate. It may also be possible to make the pitfall more appealing to bugs by altering the height, angle, placement or texture of the pitfall, as well as the fillet of the rim.

These results indicate that the trap housings and pitfalls are capable of capturing live bugs, and that elongate or elliptical traps capture significantly more bugs inside and outside the trap, respectively, compared to square or circular traps. This increased capture rate is likely due to the increased surface area of the trap and subsequent increased encounter rate by bugs.

Figure 12:
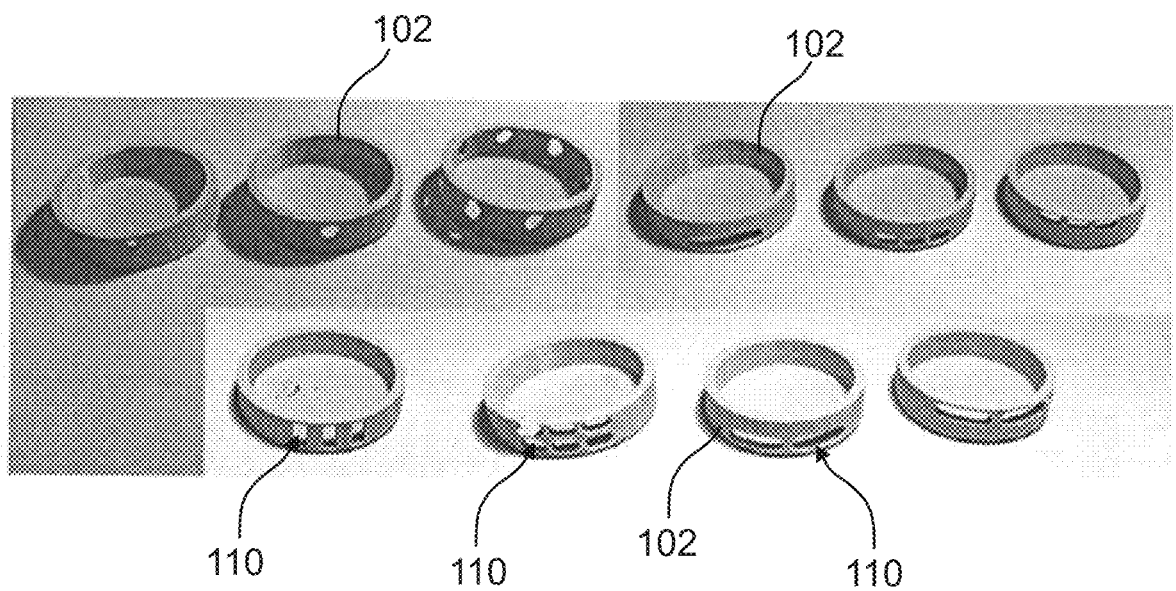
FIG. 12 is an image of various alternative embodiments of a plurality of insect detector or trap entrance hole sizes with various configurations and features configured for use with the detector of FIG. 1.

Experimental Example 2: Effect of Exemplary Insect Detector Entrance Hole Size and Height on Bed Bug Capture Rate Materials & Methods: Several 3D-printed, PLA housings were created (50 mm diameter and 12.5 mm in height) with entrances of various heights, widths, entrance number, and height off the floor, as shown in FIG. 12. Groups of 4 traps were placed equidistant from the center of a 15"×20" arena. 20-30 adult bed bugs were released into the center of the arena and their position inside or outside experimental traps was recorded after 10 minutes. Ten replicates were performed for each test and traps were randomly repositioned between tests. Each test was intended to determine the effect of the following parameters. Various parameters of 1) entrance length; 2) entrance height; 3) entrance number; 4) entrance shape; 5) the choice between a horizontal entrance vs. a vertical entrance; 6) the entrance height above ground; and 7) the choice of having an overhang above the entrance vs. not having an overhang above the entrance, were each evaluated as various tested parameters.

Results: The result showed that with respect to the first parameter, 40 mm wide entrances increased bug capture vs. 25 mm, 4 mm, or double 15 mm entrances. Regarding the second parameter, a high entrance length of 4 mm wide entrances increased bug capture vs. 25 mm, 40 mm, or double 15 mm high entrances. Regarding the third parameter, an entrance number of eight 4 mm holes increased capture vs. two 15 mm, one 40 mm, or three 2 mm columns. Regarding the fourth parameter, two 15 mm entrances caught more bugs when placed high vs. placed low. Regarding the fifth parameter, an overhang above the entrance caught more bugs when placed high vs. when placed low. Regarding the sixth parameter, bug entrance into housings may also be improved by increasing entrance height above the ground. Regarding the seventh parameter, providing an overhang to cast a shadow increased the incidence of bug entrance. In some embodiments, the incidence of bed bug entrance into the housing can be significantly increased by increasing the entrance length or by increasing the number of entrances. In some embodiments, several smaller entrances (4 mm diam. holes) may work as well or better than one wide entrance (e.g., 40 mm length).

Experimental Example 3: Bed Bug Capture Rate when Insect Detector Trap Housing Comprises Optional Radiating Spokes Materials and methods: Two 3D-printed, prototype PLA traps were provided. Both traps were 50 mm diameter hollow discs, 12.5 mm height, with a pair of 4 mm tall×15 mm long entrances leading to the hollow internal section of the trap. A third trap, also 3D-printed from PLA was 2" tall×1" wide, with a roughened outer surface, allowing bed bugs to enter the trap when attached vertically to the side of a bed leg.

Figure 13:
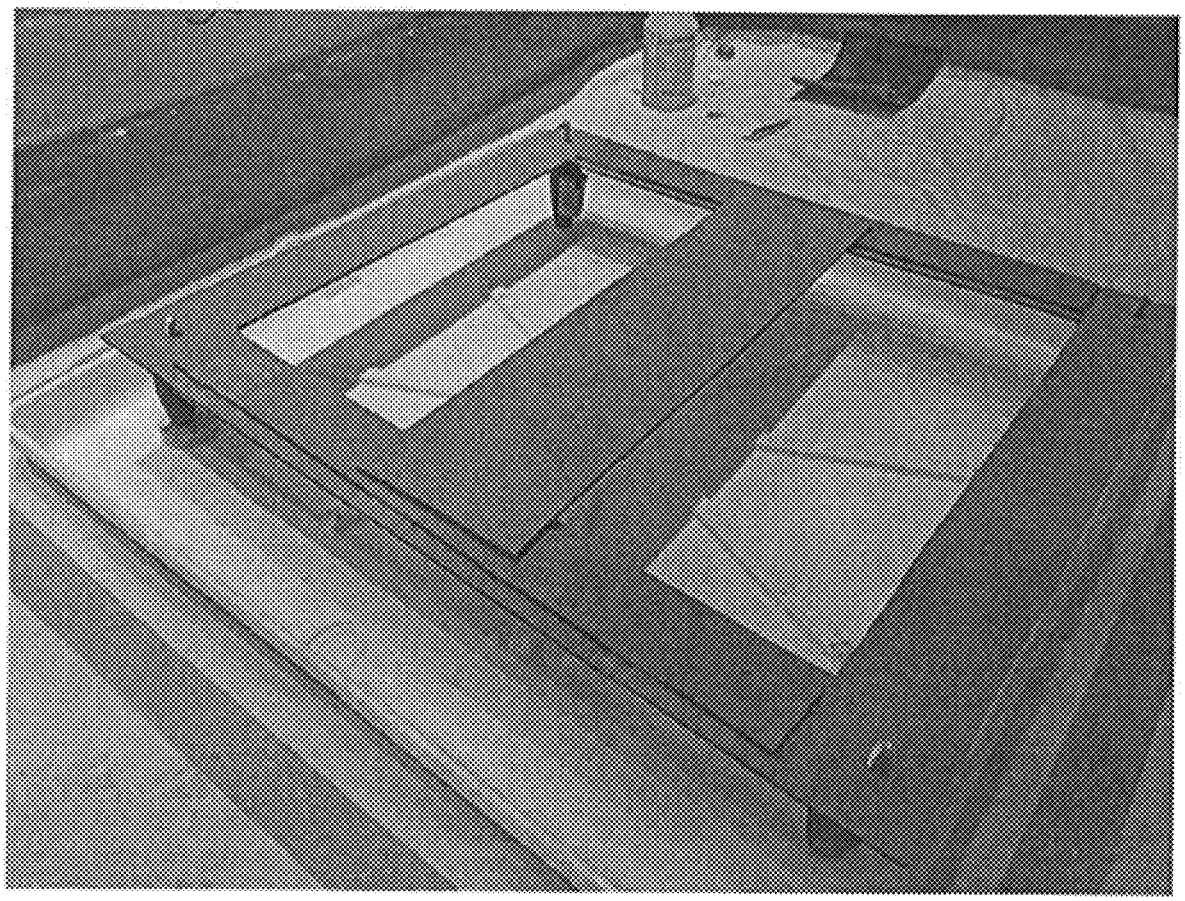
FIG. 13 is an image of a plurality of insect guidance spindles or ridges placed under a bed or furniture, configured for use with the detector of FIG. 1.

A test arena was constructed inside an inflatable pool (in order to prevent bed bug escape) containing a plastic tray within the arena as shown in FIG. 13, which included a square tray (30"×30") with 8 raised, linear ridges (7.5" long) radiating out from the tray's center.

For the test of the influence of radiating spokes, all traps were placed within a test arena containing raised ridges, with spokes radiating from the center of the arena. The disc-shaped traps were placed either adjacent to a bed leg or under the center of the cardboard bed frame, and the vertically attached trap was adhered directly to the side of a bed leg. For each test, an individual bed bug was introduced to one end of the arena (farthest from traps) and was allowed to roam freely for 30 minutes. After 30 minutes, the bug's position (inside, outside, or on) any traps was recorded. Each test was repeated 20 times. The location of bugs in each test was compared using Chi Squared test, alpha=0.05.

Results: A statistically similar number of adult bed bugs were captured after 30 minutes regardless of the trap's position (under bed legs, adjacent to bed legs, or attached vertically to bed legs), indicating that the detector housing does not necessarily need to be placed on or under the bed leg for it to capture bed bugs.

Significantly more adult bugs were captured in traps that were located under the middle of the cardboard frame when tests were performed in trays with raised ridges radiating from the tray's center (as shown in FIG. 13). It was observed that bugs often encountered one of the raised ridges, followed it toward the center of the tray (where the trap was located), then entered the trap housing. This ridge-following behaviour suggests radiating spokes increase trap-capture/detection-rates if present as part of the trap design.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A remote insect detector, comprising:
   a pitfall trap adapted to trap a target insect within;
   an insect funnel passage located below the pitfall trap and dimensioned to retain the target insect in a detecting position; and
   an optical beam detection circuit operable to detect the target insect in the detecting position and to generate a detection signal.

2. The detector of claim 1, further comprising a housing containing the pitfall trap, the insect funnel passage and the optical beam detection circuit.

3. The detector of claim 2, further comprising a plurality of insect entrance holes in the housing, which provides a pathway for the target insect to enter the housing and reach the pitfall trap.

4. The detector of claim 2, wherein the housing is substantially elliptical in outer shape, and
   wherein the housing additionally comprises a top cover fitting over the housing, and adapted to restrict entry of light into the pitfall trap.

5. The detector of claim 1, wherein the pitfall trap further comprises a frustum with a substantially conical frustum shape, wherein an outer surface of the frustum has a substantially textured surface, and an inner surface of the frustum has a substantially smooth surface, adapted to allow the target insect to climb the outside surface and fall down the inside surface to become trapped in the pitfall trap.

6. The detector of claim 5, wherein an upper rim of the pitfall trap connecting the outer surface and the inner surface of the pitfall trap is substantially smooth in texture and adapted to cause the target insect to fall into the pitfall trap.

7. The detector of claim 1, wherein the target insect is a bed bug.

8. The detector of claim 1, further comprising a detection beam passage, which intersects with the insect funnel passage to position the target insect in a detecting position.

9. The detector of claim 1, further comprising a wireless communication transmitter adapted to transmit the detection signal electromagnetically.

10. The detector of claim 1, wherein the optical beam detection circuit is powered by a battery power source.

\* \* \* \* \*